(12) United States Patent
Hu et al.

(10) Patent No.: US 10,759,526 B2
(45) Date of Patent: Sep. 1, 2020

(54) POWER ASSEMBLY AND AIRCRAFT (71) Applicant: AUTEL ROBOTICS CO., LTD., Shenzhen, Guangdong (CN)

(72) Inventors: Liangjun Hu, Guangdong (CN); Longxue Qiu, Guangdong (CN)

(73) Assignee: AUTEL ROBOTICS CO., LTD., Shenzhen, Guangdon (CN)

( * ) Notice: Subject to any disclaimer, the term of this patent is extended or adjusted under 35 U.S.C. 154(b) by 71 days.

(21) Appl. No.: 16/193,271

(22) Filed: Nov. 16, 2018

(65) Prior Publication Data
US 2019/0100301 A1    Apr. 4, 2019

Related U.S. Application Data

(63) Continuation of application No. PCT/CN2017/111720, filed on Nov. 17, 2017.

(30) Foreign Application Priority Data

Nov. 18, 2016 (CN) .......................... 2016 1 1026278

(51) Int. Cl.
*B64C 27/14* (2006.01)
*F16F 15/126* (2006.01)
(Continued)

(52) U.S. Cl.
CPC ............ *B64C 27/14* (2013.01); *B64C 27/001* (2013.01); *B64C 27/32* (2013.01); *B64C 39/024* (2013.01);
(Continued)

(58) Field of Classification Search
CPC ........ B64C 2027/003; B64C 2201/024; B64C 2201/027; B64C 2201/042;
(Continued)

(56) References Cited

U.S. PATENT DOCUMENTS 2,563,020 A * 8/1951 Gemeinhardt ......... A63H 27/02
416/208
3,245,476 A * 4/1966 Rodwick ................ B63H 23/34
416/241 R
(Continued)

FOREIGN PATENT DOCUMENTS

CN     103921937 A     7/2014
CN     204674818 U     9/2015
(Continued)

OTHER PUBLICATIONS

International Search Report and Written Opinion dated Jan. 26, 2018; PCT/CN2017/111720.

*Primary Examiner* — Medhat Badawi (57) ABSTRACT

The present invention provides a power assembly, including: a motor, a fixing base and a propeller. The fixing base is sleeved over a motor rotation shaft and is fastened to a base body of the motor, and the fixing base is provided with a first clamping portion. The propeller includes a base portion and a blade extending from the base portion, and the base portion is provided with a second clamping portion clamped to the first clamping portion. The propeller is detachably connected to the motor by engaging the first clamping portion with the second clamping portion, so that the propeller can be effectively prevented from loosening from the motor during the vibration or acceleration, and is easy to disassemble/assemble and carry.

14 Claims, 6 Drawing Sheets

(51) Int. Cl.
*F16D 1/112* (2006.01)
*B64C 39/02* (2006.01)
*B64C 27/00* (2006.01)
*B64C 27/32* (2006.01)

(52) U.S. Cl.
CPC ............ *F16D 1/112* (2013.01); *F16F 15/126* (2013.01); *B64C 2027/003* (2013.01); *B64C 2201/024* (2013.01); *B64C 2201/027* (2013.01)

(58) Field of Classification Search
CPC ... B64C 2211/00; B64C 27/001; B64C 27/14; B64C 27/32; B64C 39/024; B64D 27/24; F16D 1/112; F16F 15/126
See application file for complete search history.

(56) References Cited

U.S. PATENT DOCUMENTS

| | | | | |
|---|---|---|---|---|
| 4,101,070 | A * | 7/1978 | Hoare | A47J 43/08 403/348 |
| 5,201,679 | A * | 4/1993 | Velte, Jr. | B63H 23/34 416/134 R |
| 5,593,265 | A * | 1/1997 | Kizer | F16B 21/02 403/325 |
| 5,593,283 | A * | 1/1997 | Scott | F04D 19/002 416/169 A |
| 7,086,843 | B2 * | 8/2006 | Cheng | F04D 29/023 417/354 |
| 7,200,982 | B2 * | 4/2007 | Vandyke | A01D 75/182 56/17.5 |
| 8,430,709 | B1 * | 4/2013 | Wong | A63H 27/02 446/34 |
| 9,057,273 | B2 * | 6/2015 | Wang | A63H 27/02 |
| 9,061,763 | B1 * | 6/2015 | Christensen | A63H 17/28 |
| 9,914,538 | B2 * | 3/2018 | Yu | B64C 39/024 |
| 9,981,744 | B2 * | 5/2018 | Choo | B64C 39/028 |
| 9,994,305 | B1 * | 6/2018 | Moldovan | B64C 29/0016 |
| 10,124,888 | B2 * | 11/2018 | Pounds | A63H 27/00 |
| 2002/0104922 | A1 * | 8/2002 | Nakamura | B64C 27/08 244/17.25 |
| 2005/0051667 | A1 * | 3/2005 | Arlton | B64C 27/10 244/17.11 |
| 2005/0082421 | A1 * | 4/2005 | Perlo | A63H 27/12 244/12.2 |
| 2009/0127984 | A1 * | 5/2009 | Lee | H02K 7/09 310/67 R |
| 2013/0287577 | A1 * | 10/2013 | Lin | B64C 11/04 416/210 R |
| 2014/0299708 | A1 * | 10/2014 | Green | B64C 27/32 244/17.23 |
| 2014/0314565 | A1 * | 10/2014 | Ghapgharan | H02K 7/003 416/1 |
| 2014/0356174 | A1 * | 12/2014 | Wang | B64C 11/02 416/204 R |
| 2014/0377051 | A1 * | 12/2014 | Sun | F01D 17/148 415/1 |
| 2016/0288901 | A1 * | 10/2016 | Fisher | B64C 11/02 |
| 2017/0240267 | A1 * | 8/2017 | Tao | B64C 11/04 |
| 2018/0327113 | A1 * | 11/2018 | von Flotow | F15B 9/14 |

FOREIGN PATENT DOCUMENTS

| | | |
|---|---|---|
| CN | 105173072 A | 12/2015 |
| CN | 105517890 A | 4/2016 |
| CN | 205345333 U | 6/2016 |
| CN | 105799916 A | 7/2016 |
| CN | 205661649 U | 10/2016 |
| CN | 106347653 A | 1/2017 |
| CN | 204998753 U | 1/2017 |
| CN | 106687370 A | 5/2017 |
| CN | 206202677 U | 8/2017 |
| CN | 206374967 U | 8/2017 |

* cited by examiner

POWER ASSEMBLY AND AIRCRAFT

CROSS-REFERENCE

This application is a continuation application of International Application No. PCT/CN2017/111720, filed on 17 Nov. 2017, which claims priority to Chinese Patent Application No. 2016110262781, filed on 18 Nov. 2016, which is incorporated herein by reference in its entirety.

BACKGROUND

Technical Field

The present invention relates to the field of aircraft technologies, and in particular, to a power assembly and an aircraft.

Related Art

An existing aircraft usually includes an aircraft body, an aircraft arm connected to the aircraft body and a power assembly disposed on the aircraft arm. The power assembly includes a motor and a propeller connected to a rotation shaft of the motor. The propeller generally includes a base connected to the rotation shaft of the motor and a propeller connected to the base. Driven by the motor, the rotation shaft rotates to drive a blade to rotate. Currently, the base is generally connected to the rotation shaft by using threads.

When the base is connected to the rotation shaft by using threads, because a tightening direction of the base is the same as a rotation direction of the blade in a working process, the blade is desirably connected to the rotation shaft in a starting and working process. However, when the speed of the blade suddenly decreases or the acceleration of the blade changes greatly, the base is likely to loosen from the rotation shaft due to the acceleration. Besides, in case of large amplitude of vibration, the propeller is also likely to get loose from the rotation shaft of the motor, resulting in propeller falling. Moreover, after a collision, the propeller needs to be unscrewed by using a tool.

SUMMARY

In view of the foregoing problems, the present invention provides a power apparatus, a propeller, and an aircraft that are firmly assembled and easy to disassemble.

To achieve the foregoing objective, embodiments of the present invention provide a power assembly, including:

a motor, including a base body and a motor rotation shaft connected to the base body;

a fixing base, sleeved over the motor rotation shaft and connected to the base body, where the fixing base is provided with a first clamping portion; and a propeller, including a base portion and a blade extending from the base portion, where the base portion is provided with a second clamping portion clamped to the first clamping portion, and the base portion is sleeved over the rotation shaft and is connected to the fixing base by clamping engagement between the first clamping portion and the second clamping portion.

In an embodiment of the present invention, the fixing base has a top surface far away from the base body of the motor and a ring-shaped body that is connected to the top surface and that encircles to form an accommodating space with the top surface, wherein the top surface is provided with a through hole for passing through by the second clamping portion, and the first clamping portion is disposed on a surface of the top surface facing the accommodating space.

In an embodiment of the present invention, along a circumference of the top surface facing the surface of the accommodating space, a plurality of first projections are disposed at intervals, wherein a fixing groove is formed between any two adjacent first projections, and wherein the first clamping portion is the fixing groove.

In an embodiment of the present invention, the second clamping portion is a stopper disposed on the base portion.

In an embodiment of the present invention, the base portion includes a pedestal and a connection shaft connected to the pedestal, and the second clamping portion is disposed on the connection shaft.

In an embodiment of the present invention, the through hole includes a circular portion for passing through by the connection shaft and an extending portion in communication with the circular portion, and the shape of the extending portion is the same as that of the second clamping portion.

In an embodiment of the present invention, the stopper is disposed at the bottom of the base portion, and the stopper includes a vertical portion connected to the bottom of the base portion and a blocking portion extending from the vertical portion in a bending manner.

In an embodiment of the present invention, the through hole includes a first through hole whose shape is the same as that of the stopper and a second through hole in communication with the first through hole, and the second through hole is arc-shaped.

In an embodiment of the present invention, the power assembly further includes an elastic component sleeved over the motor rotation shaft, wherein one end of the elastic component abuts against a bottom surface of the base portion facing the base body, and the other end of the elastic component abuts against the base body of the motor.

In an embodiment of the present invention, the power assembly further includes a blocking ring sleeved over the motor rotation shaft and located above the elastic component, wherein one side of the blocking ring abuts against the base portion, and the other side of the blocking ring abuts against one end of the elastic component.

Another technical solution adopted in the present invention to resolve the technical problems of the present invention is to construct an aircraft, including an aircraft body, an aircraft arm connected to the aircraft body and the foregoing power assembly disposed on the aircraft arm.

Beneficial effects of the present invention are as follows: The propeller is detachably connected to the motor by engaging the first clamping portion with the second clamping portion, so that the propeller can be effectively prevented from loosening from the motor during the vibration or acceleration, and is easy to disassemble/assemble and carry.

DETAILED DESCRIPTION

For ease of understanding the present invention, the following describes the present invention in further detail with reference to the accompanying drawings and specific implementations. It should be noted that when an element is described as being "fixed" on another element, the element may be directly on the another element, or there may be one or more intermediate elements therebetween. When an element is described as being "connected" to another element, the element may be directly connected to the another element, or there may be one or more intermediate elements therebetween. Terms such as "perpendicular", "horizontal", "left", "right" and similar expressions adopted in the specification are only for description purposes.

Meanings of all technical and scientific terms adopted in this specification are the same as that usually understood by a person skilled in the technical field to which the present invention belongs, unless otherwise defined. The terms adopted in this specification of the present invention are merely intended to describe specific implementations rather than limiting the present invention. The term "and/or" adopted in the specification includes any or all combinations of one or more related items listed.

Figure 1:
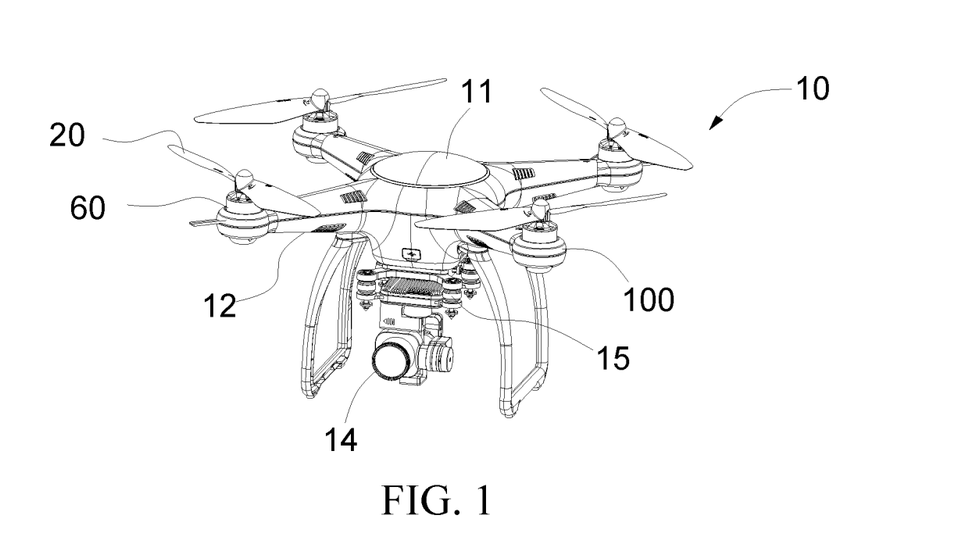
FIG. 1 is a schematic structural diagram of an aircraft according to an embodiment of the present invention.
Figure 2:
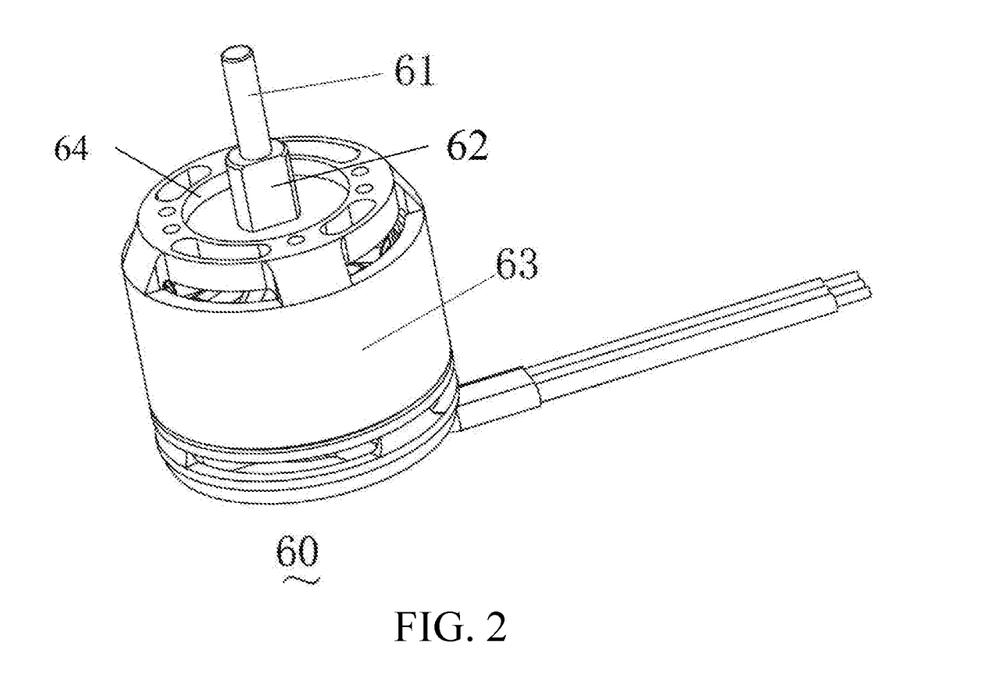
FIG. 2 is a schematic structural diagram of a motor according to an embodiment of the present invention.
Figure 3:
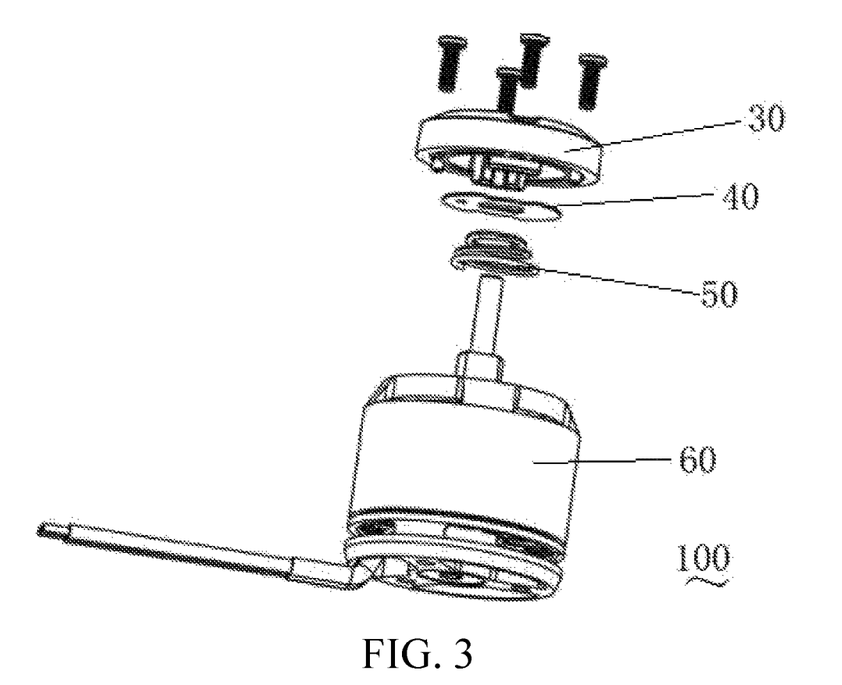
FIG. 3 is an exploded view of a motor and a fixing base according to an embodiment of the present invention.

As shown in FIG. 1 to FIG. 3, an aircraft 10 includes an aircraft body 11, an aircraft arm 12 connected to the aircraft body 11, a power assembly 100 disposed at one end of the aircraft arm 12, a gimbal 15 connected to the aircraft body 11, and an imaging device 14 connected to the gimbal 15.

In this embodiment, there are four aircraft arms 12, that is, the aircraft is a four-rotor aircraft. In another possible embodiment, there may be three, six, eight, ten aircraft arms 12, or the like.

The gimbal 15 is configured to reduce or even eliminate vibration transmitted by the power assembly 100 to the imaging device 14, to ensure that the imaging device 14 can shoot stably clear images or videos.

The imaging device 14 may be a similar device such as a binocular camera, a monocular camera, an infrared imaging device, an ultraviolet imaging device, or a camcorder. The imaging device 14 may be directly equipped on the aircraft 10, or may be equipped on the aircraft 10 by using the gimbal 15 shown in this embodiment. The gimbal 15 allows the imaging device 14 to rotate around at least one shaft relative to the aircraft 10.

The power assembly 100 includes: a motor 60 disposed at one end of the aircraft arm 12, and a propeller 20 and a fixing base 30 connected to the motor 60.

The motor 60 includes a base body 63 and a motor rotation shaft connected to the base body 63, the motor rotation shaft includes a rotation shaft 61 and a connection component 62, and the diameter of the connection component 62 is greater than that of the rotation shaft 61.

Figure 5:
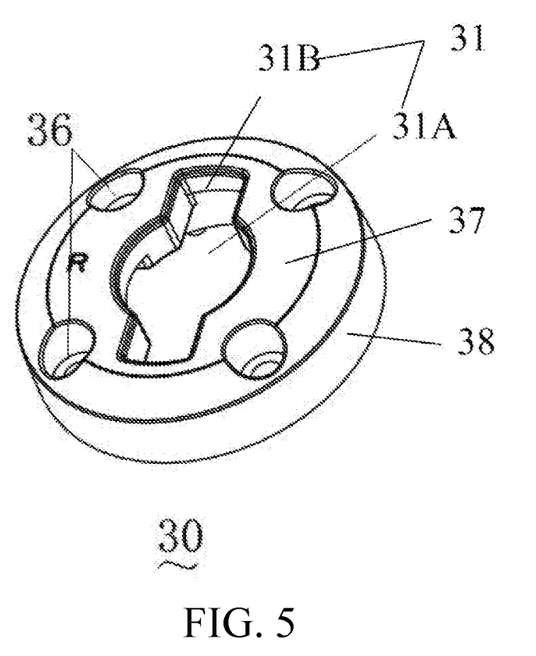
FIG. 5 is a schematic structural diagram of an embodiment of a fixing base according to the present invention.
Figure 6:
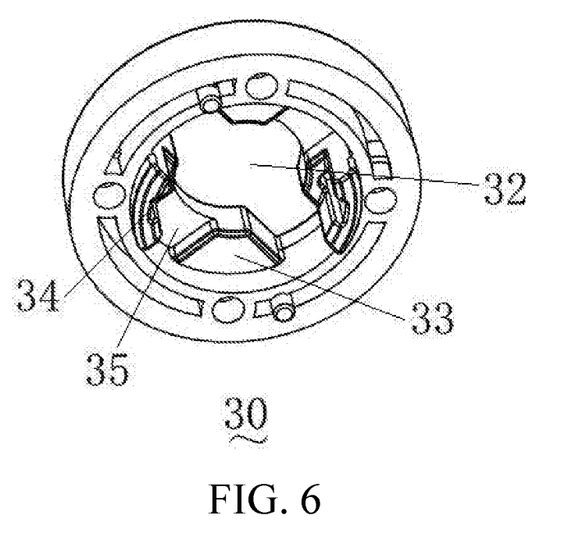
FIG. 6 is a schematic structural diagram of the fixing base shown in FIG. 5 from another visual angle.

As shown in FIG. 3, the fixing base 30 is sleeved over the motor rotation shaft and is connected to the base body 63 of the motor. In an embodiment of the present invention, as shown in FIG. 5 and FIG. 6, the fixing base 30 has a top surface 37 far away from the base body 63 and a ring-shaped body 38 that encircles to form an accommodating space 32 with the top surface 37, and the fixing base 30 is provided with a first clamping portion. In an embodiment of the present invention, along a circumference of the top surface 37, four tapped holes 36 are provided, and the fixing base 30 is fixedly connected to the base body 63 of the motor 60 by using four screws passing through the tapped holes 36.

Figure 4:
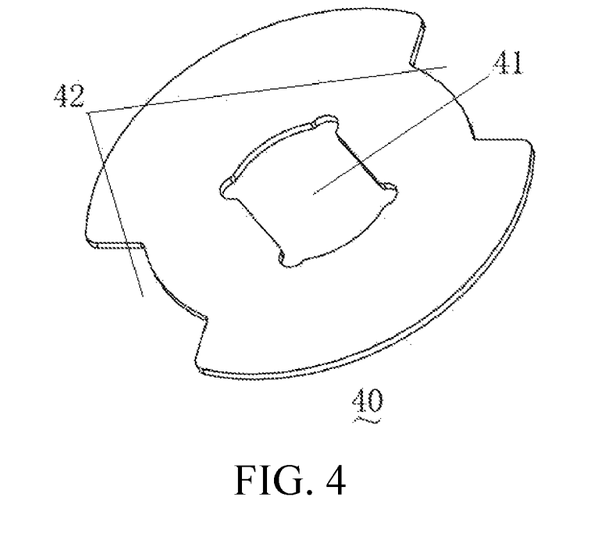
FIG. 4 is a schematic structural diagram of a blocking ring according to an embodiment of the present invention.

As shown in FIG. 3 and FIG. 4, in an embodiment of the present invention, the power assembly 100 further includes an elastic component 50 sleeved over the motor rotation shaft and a blocking ring 40 sleeved over the motor rotation shaft, and the blocking ring 40 is located above the elastic component 50. In an embodiment of the present invention, the elastic component 50 is a variable-diameter spring, one end of the elastic component 50 that has a small inner diameter abuts against the lower surface of the blocking ring 40, and the other end abuts against the base body 63. A through hole 41 similar to a rectangle is provided at the center of the blocking ring 40, and two arc-shaped gaps 42 are further provided in the circumference of the blocking ring 40.

As shown in FIG. 6, in an embodiment of the present invention, four first projections 33 are disposed at intervals along the circumference of the surface of the top surface 37 of the fixing base 30 facing the accommodating space 32, and a fixing groove 35 is formed between any two adjacent first projections 33. In an embodiment of the present invention, the first clamping portion is the fixing groove 35.

In an embodiment of the present invention, a second projection 34 connected to the ring-shaped body 38 is further disposed on the fixing base 30. The second projection 34 is disposed along a circumference of the ring-shaped body 38, projects out from a bottom surface of the ring-shaped body 38 and is arc-shaped. The second projection 34 is inserted into the gap 42 of the blocking ring 40 in an assembly state. The second projection 34 abuts against a ring-shaped inner wall surface 64 (as shown in FIG. 2) of the base body 63 of the motor to provide a positioning function. This structure makes assembly of the fixing base 30 and the base body 63 easier.

Figure 7:
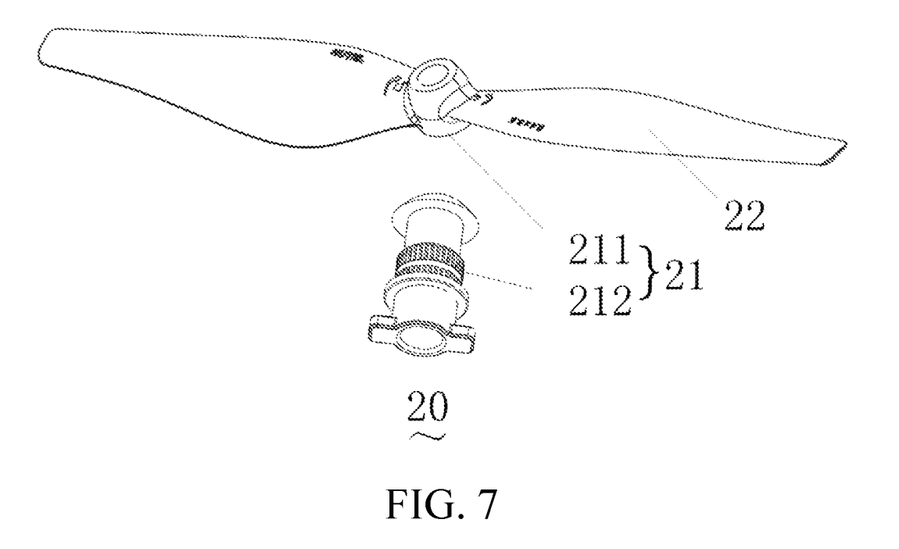
FIG. 7 is a schematic structural diagram of an embodiment of a propeller according to the present invention.
Figure 8:
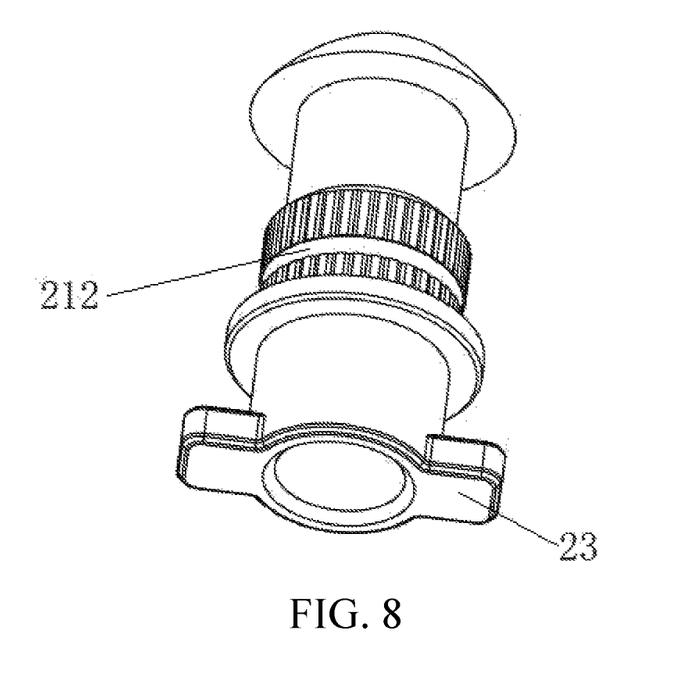
FIG. 8 is a schematic structural diagram of a connection shaft in the propeller shown in FIG. 7.
Figure 9:
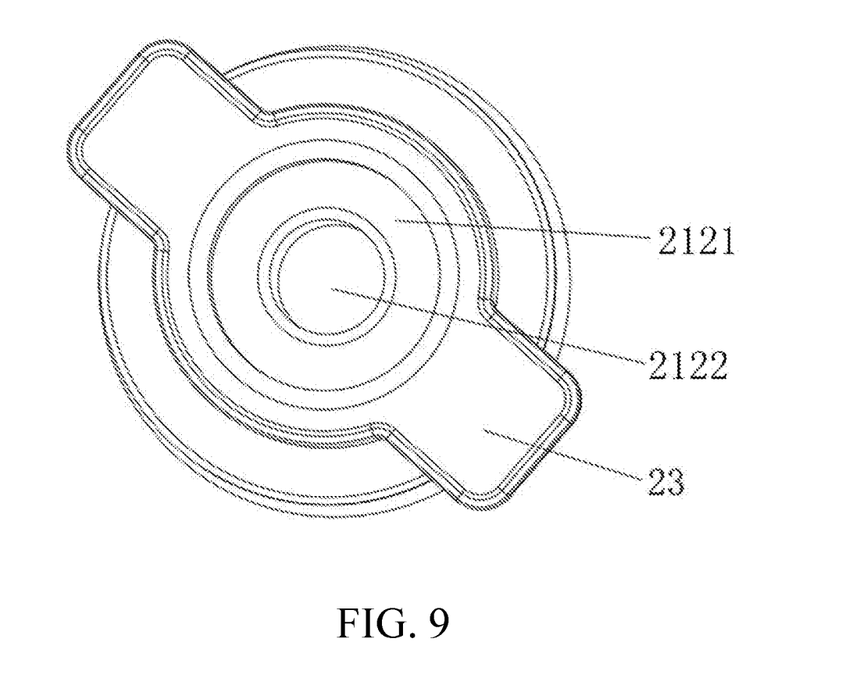
FIG. 9 is a bottom view of the connection shaft shown in FIG. 8.

As shown in FIG. 7 to FIG. 9, in an embodiment of the present invention, the propeller 20 includes a base portion 21, a blade 22 extending from the base portion 21, and a second clamping portion connected to the base portion 21. In an embodiment of the present invention, the second clamping portion is a stopper 23. The blade 22 and the base portion 21 may be integrally formed, or the blade 22 may be connected to the base portion 21 in other fixing connection manners. In an embodiment of the present invention, the base portion 21 includes a pedestal 211 and a connection shaft 212 connected to the pedestal 211. The stopper 23 is disposed on the connection shaft 212 and extends away from the central axis of the connection shaft 212 along a bottom surface of the connection shaft 212.

FIG. 9 is a bottom view of the base portion 21. A connection hole (not shown) is provided in the connection shaft 212 of the base portion 21 and is configured to be sleeved over the motor rotation shaft. The connection hole also includes a first circular hole 2121 and a second circular hole 2122, the first circular hole 2121 is in communication with the second circular hole 2122, the diameter of the first circular hole 2121 is greater than that of the second circular hole 2122, and a transitional surface is formed between the first circular hole 2121 and the second circular hole 2122. The first circular hole 2121 is configured to accommodate the connection component 62, and the second circular hole 2122 is configured to accommodate the rotation shaft 61. In an assembly state, the upper end of the connection component 62 of the motor rotation shaft abuts against the transitional surface of the first circular hole 2121 and the second circular hole 2122. In this case, the connection shaft 212 cannot continue to move downwards, to prevent the connection shaft 212 from crushing the elastic component 50 or the blocking ring 40.

As shown in FIG. 5, the top surface 37 of the fixing base 30 is further provided with a through hole 31 used for the second clamping portion, that is, the stopper 23. In an embodiment of the present invention, the through hole 31 includes a circular portion 31A for passing through by the connection shaft 212 and an extending portion 31B in communication with the circular portion 31A. The shape of the extending portion 31B is the same as that of the stopper 23.

During assembly, the stopper 23 on the connection shaft 212 is aligned with the extending portion 31B of the through hole 31 and is inserted into the through hole 31, so that the connection shaft 212 and the stopper 23 are located in the accommodating space 32. In this case, the elastic component 50 is in a pressed state. The connection shaft 212 rotates so that the stopper 23 is fastened in the fixing groove 35. Under an elastic restoring force of the elastic component 50, one side of the blocking ring 40 abuts against the bottom surface of the connection shaft 212 and the stopper 23, and the other side abuts against the elastic component 50. In this case, the stopper 23 is tightly pressed in the fixing groove 35, thereby completing assembly of the propeller 20 and the motor 60. In this embodiment of the present invention, the blocking ring 40 is used for: 1. evenly allocating an abutting force; and 2. covering the elastic component 50 for decoration, so that a person cannot see the inner structure when viewing outside.

During disassembly, the connection shaft 212 is pressed downwards, so that the stopper 23 detaches from the fixing groove 35. In this case, the elastic component 50 is further pressed to rotate the connection shaft 212 to a position at which the stopper 23 is aligned with the extending portion 31B of the through hole 31. The connection shaft 212 is pulled out to complete the disassembly.

Figure 10:
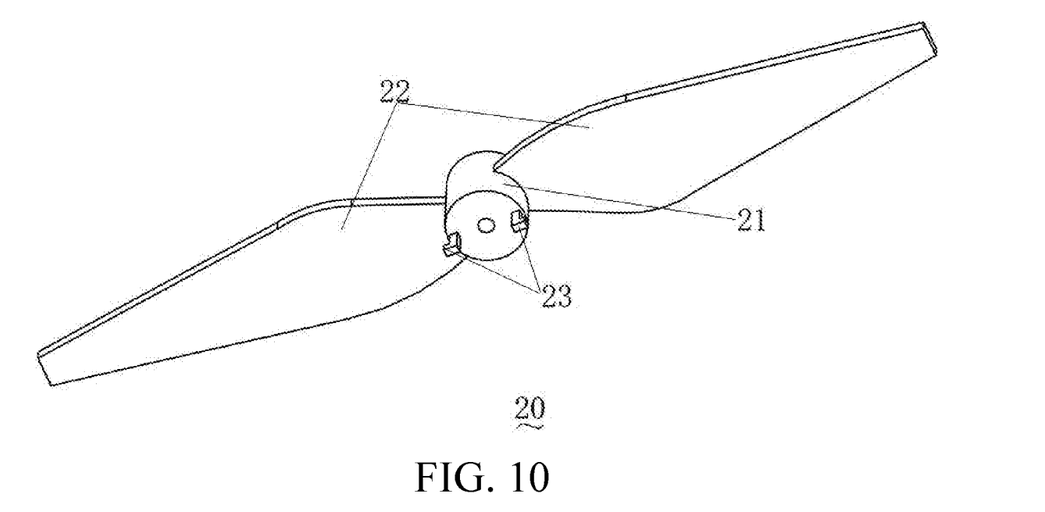
FIG. 10 is a schematic structural diagram of another embodiment of a propeller according to the present invention.

The propeller 20 of the present invention is fastened to the motor 60 by clamping engagement of the stopper 23 and the fixing groove 35. The elastic component 50 and the blocking ring 40 tightly press the stopper 23 to further strengthen the connection between the propeller 20 and the motor 60. Therefore, the propeller 20 can be effectively prevented from loosening from the motor 60 during the vibration or acceleration, and is easy to disassemble/assemble and carry. As shown in FIG. 10, the propeller 20 includes the base portion 21, the blade 22 extending from the base portion 21, and the stopper 23 disposed on a bottom surface of the base portion 21. An accommodation hole for accommodating the motor rotation shaft is further provided on the bottom surface of the base portion 21. In this embodiment of the present invention, the stopper 23 includes a vertical portion and a blocking portion approximately perpendicular to the vertical portion, that is, the stopper 23 is approximately L-shaped. Two stoppers 23 are disposed on the bottom surface of the base portion 21, and the two stoppers 23 are symmetrically disposed relative to the central axis of the base portion 21.

Figure 11:
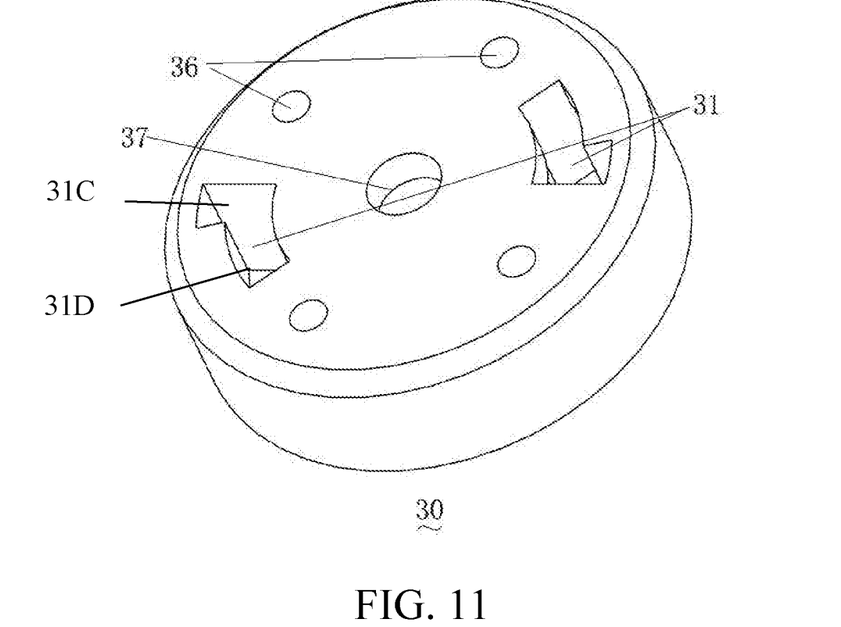
FIG. 11 is a schematic structural diagram of another embodiment of a fixing base according to the present invention.
Figure 12:
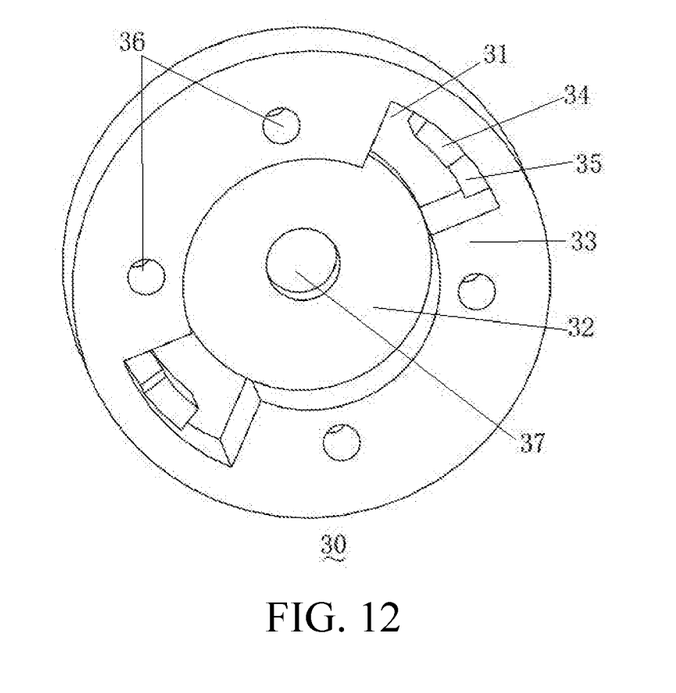
FIG. 12 is a schematic structural diagram of the fixing base shown in FIG. 11 from another visual angle.

As shown in FIG. 11 and FIG. 12, the fixing base 30 includes the through hole 31, the accommodating space 32, the first projection 33, the second projection 34, the fixing groove 35, the tapped hole 36 and a shaft hole 37. The shaft hole 37 is disposed at the center of the upper end of the fixing base 30, and the through hole 31 is disposed on two sides of the shaft hole 37. Each through hole 31 includes a first through hole 31C matching the shape of the blocking portion of the stopper 23 and a second through hole 31D in communication with the first through hole 31C. The second through hole 31D is arc-shaped. The two through holes 31 are centrosymmetrically disposed relative to the shaft hole 37.

The stopper 23 passes through the through hole 31 and is inserted into the fixing base 30. Specifically, in this embodiment, the fixing base 30 is cylindrical, the lower surface of the fixing base 30 is recessed inwardly to form the accommodating space 32, and the accommodating space 32 is in communication with the through hole 31. The bottom of the accommodating space 32 extends downwards to form the first projection 33 and the second projection 34, there are two first projections 33 and two second projections 34, and the fixing groove 35 is formed between the first projection 33 and the second projection 34. The first projection 33, the fixing groove 35, the second projection 34, and the through hole 31 are sequentially distributed along a circular track of the accommodating space 32. The height of the first projection 33 that projects out from the bottom of the accommodating space 32 is greater than that of the second projection 34. The stopper 23 is inserted into the fixing groove 35, and two sides of the stopper 23 are clamped by side walls of the first projection 33 and the second projection 34, to prevent the stopper 23 from rotating relative to the fixing base 30. Four tapped holes 36 are provided around the through hole 31, and a bolt passes through the tapped hole 36 to fasten the fixing base 30 to the base body 63 of the motor 60. The elastic component 50 is sleeved over the motor rotation shaft 61, and the elastic component 50 and the motor rotation shaft 61 jointly pass through the shaft hole 37. One end of the elastic component 50 abuts against the base body 63 of the motor 60, and the other end is configured to abut against an end surface of the lower end of the base portion 21, so that the stopper 23 is inserted into the fixing groove 35 and cannot move downwards to detach from the fixing groove 35, and the propeller 20 is firmly fastened under the effects of both the fixing groove 35 and the elastic component 50.

The foregoing descriptions are only implementations of the present invention, and are not intended to limit the patent scope of the present invention. Equivalent structures or equivalent procedure changes made by using the specification and the accompanying drawings of the present invention, or direct or indirect application to other related technical fields are similarly included in the patent protection scope of the present invention.

What is claimed is:

1. A power assembly, comprising:
   a motor, comprising a base body and a motor rotation shaft connected to the base body;
   a fixing base, sleeved over the motor rotation shaft and connected to the base body, wherein the fixing base is provided with a first clamping portion; and
   a propeller, comprising a base portion and a blade extending from the base portion, wherein the base portion is provided with a second clamping portion clamped to the first clamping portion, and the base portion is sleeved over the rotation shaft and is connected to the fixing base by clamping engagement between the first clamping portion and the second clamping portion;

wherein the power assembly further comprises an elastic component sleeved over the motor rotation shaft, the elastic component is a variable-diameter spring;

wherein one end of the elastic component abuts against a bottom surface of the base portion facing the base body, and the other end of the elastic component abuts against a base body of the motor;

wherein the power assembly further comprises a blocking ring sleeved over the motor rotation shaft and located above the elastic component, wherein one side of the blocking ring abuts against the base portion, and the other side of the blocking ring abuts against one end of the elastic component;

wherein a through hole is provided at the center of the blocking ring, and two arc-shaped gaps are further provided in the circumference of the blocking ring.

2. The power assembly according to claim 1, wherein along a circumference of the top surface facing the surface of the accommodating space, a plurality of first projections are disposed at intervals, wherein a fixing groove is formed between any two adjacent first projections, and wherein the first clamping portion is the fixing groove.

3. The power assembly according to claim 1, wherein the second clamping portion is a stopper disposed on the base portion.

4. The power assembly according to claim 1, wherein the base portion comprises a pedestal and a connection shaft connected to the pedestal, and the second clamping portion is disposed on the connection shaft.

5. The power assembly according to claim 4, wherein the through hole comprises a circular portion for passing through by the connection shaft and an extending portion in communication with the circular portion, and the shape of the extending portion is the same as that of the second clamping portion.

6. The power assembly according to claim 3, wherein the stopper is disposed at the bottom of the base portion, and the stopper comprises a vertical portion connected to the bottom of the base portion and a blocking portion extending from the vertical portion in a bending way.

7. The power assembly according to claim 6, wherein the through hole comprises a first through hole matching the shape of the blocking portion and a second through hole in communication with the first through hole, and the second through hole is arc-shaped.

8. An aircraft, comprising an aircraft body, an aircraft arm connected to the aircraft body and a power assembly disposed on the aircraft arm, wherein the power assembly comprises:

a motor, comprising a base body and a motor rotation shaft connected to the base body;

a fixing base, sleeved over the motor rotation shaft and connected to the base body, wherein the fixing base is provided with a first clamping portion; and a propeller, comprising a base portion and a blade extending from the base portion, wherein the base portion is provided with a second clamping portion clamped to the first clamping portion, and the base portion is sleeved over the rotation shaft and is connected to the fixing base by clamping engagement between the first clamping portion and the second clamping portion;

wherein the power assembly further comprises an elastic component sleeved over the motor rotation shaft, the elastic component is a variable-diameter spring;

wherein one end of the elastic component abuts against a bottom surface of the base portion facing the base body, and the other end of the elastic component abuts against a base body of the motor;

wherein the power assembly further comprises a blocking ring sleeved over the motor rotation shaft and located above the elastic component, wherein one side of the blocking ring abuts against the base portion, and the other side of the blocking ring abuts against one end of the elastic component;

wherein a through hole is provided at the center of the blocking ring, and two arc-shaped gaps are further provided in the circumference of the blocking ring.

9. The aircraft according to claim 8, wherein along a circumference of the top surface facing the surface of the accommodating space, a plurality of first projections are disposed at intervals, wherein a fixing groove is formed between any two adjacent first projections, and wherein the first clamping portion is the fixing groove.

10. The aircraft according to claim 8, wherein the second clamping portion is a stopper disposed on the base portion.

11. The aircraft according to claim 8, wherein the base portion comprises a pedestal and a connection shaft connected to the pedestal, and the second clamping portion is disposed on the connection shaft.

12. The aircraft according to claim 11, wherein the through hole comprises a circular portion for passing through by the connection shaft and an extending portion in communication with the circular portion, and the shape of the extending portion is the same as that of the second clamping portion.

13. The aircraft according to claim 10, wherein the stopper is disposed at the bottom of the base portion, and the stopper comprises a vertical portion connected to the bottom of the base portion and a blocking portion extending from the vertical portion in a bending way.

14. The aircraft according to claim 13, wherein the through hole comprises a first through hole matching the shape of the blocking portion and a second through hole in communication with the first through hole, and the second through hole is arc-shaped.

* * * * *